US009684427B2

(12) United States Patent
El Dokor et al.

(10) Patent No.: US 9,684,427 B2
(45) Date of Patent: *Jun. 20, 2017

(54) THREE-DIMENSIONAL INTERFACE

(71) Applicant: Microsoft Technology Licensing, LLC, Redmond, WA (US)

(72) Inventors: Tarek El Dokor, Phoenix, AZ (US); Joshua T. King, Mesa, AZ (US); James E. Holmes, Mesa, AZ (US); William E. Glomski, Scottsdale, AZ (US); Maria N. Ngomba, Prescott, AZ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 169 days.

This patent is subject to a terminal disclaimer.

(21) Appl. No.: 14/322,952

(22) Filed: Jul. 3, 2014

(65) Prior Publication Data
US 2015/0020031 A1  Jan. 15, 2015

Related U.S. Application Data

(63) Continuation of application No. 13/888,505, filed on May 7, 2013, now Pat. No. 8,803,801, which is a (Continued)

(51) Int. Cl.
*G09G 5/00*  (2006.01)
*G06F 3/0481*  (2013.01)
(Continued)

(52) U.S. Cl.
CPC .......... *G06F 3/04815* (2013.01); *G06F 3/011* (2013.01); *G06F 3/0304* (2013.01); *G06F 3/04842* (2013.01); *G06F 3/04845* (2013.01)

(58) Field of Classification Search
CPC ...... G06F 3/011; G06F 3/0304; G06F 3/0481; G06F 3/04815; G06F 3/04842; G06F 3/04845
(Continued)

(56) References Cited

U.S. PATENT DOCUMENTS 5,381,158 A    1/1995  Takahara et al.
5,990,865 A *  11/1999 Gard ................. G06F 3/011
                                                 345/156
(Continued)

OTHER PUBLICATIONS

Non-Final Office Action mailed on Oct. 10, 2013 for U.S. Appl. No. 13/888,505, 6 pages.
(Continued)

*Primary Examiner* — Jason Mandeville

(57) ABSTRACT

A three-dimensional virtual-touch human-machine interface system (20) and a method (100) of operating the system (20) are presented. The system (20) incorporates a three-dimensional time-of-flight sensor (22), a three-dimensional autostereoscopic display (24), and a computer (26) coupled to the sensor (22) and the display (24). The sensor (22) detects a user object (40) within a three-dimensional sensor space (28). The display (24) displays an image (42) within a three-dimensional display space (32). The computer (26) maps a position of the user object (40) within an interactive volumetric field (36) mutually within the sensor space (28) and the display space (32), and determines when the positions of the user object (40) and the image (42) are substantially coincident. Upon detection of coincidence, the computer (26) executes a function programmed for the image (42).

22 Claims, 4 Drawing Sheets

Related U.S. Application Data continuation of application No. 13/572,721, filed on Aug. 13, 2012, now Pat. No. 8,451,220, which is a continuation of application No. 11/567,888, filed on Dec. 7, 2006, now Pat. No. 8,279,168.

(60) Provisional application No. 60/749,270, filed on Dec. 9, 2005.

(51) Int. Cl.
*G06F 3/01* (2006.01)
*G06F 3/03* (2006.01)
*G06F 3/0484* (2013.01)

(58) Field of Classification Search
USPC ........ 345/156–168, 418–428, 650, 653, 679; 348/42, 169; 463/30–37
See application file for complete search history.

(56) References Cited

U.S. PATENT DOCUMENTS

| | | | |
|---|---|---|---|
| 6,064,354 A | 5/2000 | DeLuca | |
| 6,243,054 B1 | 6/2001 | DeLuca | |
| 6,278,418 B1 | 8/2001 | Doi | |
| 6,323,942 B1 | 11/2001 | Bamji | |
| 6,377,238 B1 | 4/2002 | McPheters | |
| 6,478,432 B1 | 11/2002 | Dyner | |
| 6,559,813 B1 | 5/2003 | DeLuca | |
| 6,590,605 B1 | 7/2003 | Eichenlaub | |
| 6,614,422 B1 | 9/2003 | Rafii et al. | |
| 6,710,770 B2 | 3/2004 | Tomasi et al. | |
| 6,857,746 B2 | 2/2005 | Dyner | |
| 6,940,646 B2 | 9/2005 | Taniguchi et al. | |
| 7,170,492 B2 | 1/2007 | Bell | |
| 7,348,963 B2* | 3/2008 | Bell | A63F 13/02 345/156 |
| 7,620,316 B2 | 11/2009 | Boillot | |
| 7,787,009 B2* | 8/2010 | Alpaslan | G06F 3/011 348/51 |
| 8,279,168 B2* | 10/2012 | Glomski | G06F 3/011 345/156 |
| 8,451,220 B2 | 5/2013 | El Dokor et al. | |
| 2001/0030642 A1 | 10/2001 | Sullivan et al. | |
| 2002/0041327 A1 | 4/2002 | Hildreth et al. | |
| 2002/0064382 A1 | 5/2002 | Hildreth et al. | |
| 2002/0140633 A1* | 10/2002 | Rafii | B60K 35/00 345/8 |
| 2004/0001182 A1 | 1/2004 | Dyner | |
| 2004/0183775 A1 | 9/2004 | Bell | |
| 2005/0002074 A1 | 1/2005 | McPheters et al. | |
| 2005/0083314 A1 | 4/2005 | Shalit et al. | |
| 2005/0190443 A1 | 9/2005 | Nam et al. | |
| 2006/0139314 A1 | 6/2006 | Bell | |

OTHER PUBLICATIONS

Notice of Allowance mailed on Apr. 8, 2014 for U.S. Appl. No. 13/888,505, 10 pages.
Non-Final Office Action mailed on Sep. 28, 2012 for U.S. Appl. No. 13/572,721, 7 pages.
Notice of Allowance mailed on Jan. 28, 2013 for U.S. Appl. No. 13/572,721, 10 pages.
Non-Final Office Action mailed on Mar. 19, 2010 for U.S. Appl. No. 11/567,888, 15 pages.
Final Office Action mailed on Sep. 1, 2010 for U.S. Appl. No. 11/567,888, 21 pages.
Advisory Action mailed on Nov. 16, 2010 for U.S. Appl. No. 11/567,888, 3 pages.
Non-Final Office Action mailed on Feb. 28, 2012 for U.S. Appl. No. 11/567,888, 32 pages.
Notice of Allowance mailed on Jul. 2, 2012 for U.S. Appl. No. 11/567,888, 13 pages.

* cited by examiner

THREE-DIMENSIONAL INTERFACE

RELATED INVENTIONS

The present invention is a continuation of Ser. No. 13/888,505 filed May 7, 2013 to El Dokor et al. entitled "Three-Dimensional Interface System And Method", currently pending, which is a continuation of Ser. No. 13/572,721 filed Aug. 13, 2012 to Glomski et al., entitled "Method and System for Three-Dimensional Virtual-Touch Interface", now U.S. Pat. No. 8,451,220, which is a continuation of Ser. No. 11/567,888 filed Dec. 7, 2006 to Glomski et al., entitled "Three-Dimensional Virtual-Touch Human-Machine Interface System and Method Therefore", now U.S. Pat. No. 8,279,168, which in turn claims benefit under 35 U.S.C. 119(e) to "3D Virtual-Touch HMI," U.S. Provisional Patent Application Ser. No. 60/749,270, filed 9 Dec. 2005, each of these applications being incorporated by reference herein in their entirety.

TECHNICAL FIELD OF THE INVENTION

The present invention relates to the field of human-machine interfaces. More specifically, the present invention relates to the field of human machine interfaces having three-dimensional object sensors and three-dimensional displays.

BACKGROUND OF THE INVENTION

Prior-art three-dimensional human-machine interface (3DHMI) systems using three-dimensional displays and three-dimensional object sensors are known. However, such 3DHMI systems do not effect a true volumetric interactive environment. That is, the prior-art 3DHMI systems do not permit users to virtually touch and interact with an image anywhere within a specified volume of space.

Some prior-art 3DHMI systems utilize a planar concept. This concept fixes interaction at a substantially constant distance (depth) from the user, thereby confining the user interface to a two-dimensional (breadth and height) plane in space. Such a two-dimensional interaction plane deprives the user of true three-dimensional volumetric operation.

Some prior-art 3DHMI systems require a physical surface fixed in space. Such methodologies limit the user to interaction in a field within, upon, or bound by that physical surface.

Other prior-art 3DHMI systems utilize a stereo camera concept. In this concept, images from two or more two-dimensional video cameras are processed by a computer into a single three-dimensional image. A disadvantage of the stereo camera concept is that the depth or Z-axis movement of a user object can only be approximated. A two-dimensional camera can only gather two-dimensional data, and depth must be approximated by a software algorithm that combines the multiple images. This degrades X,Y,Z accuracy, and can result in less robust operation of the system.

Another disadvantage of prior-art 3DHMI systems is that of response time. The processing of two two-dimensional images into a single three-dimensional image often requires a noticeable amount of time. This processing lag may lead to errors and false interpretations of user intent.

This lag in response time also inhibits the ability of the system to track movement though the interactive space in substantially real time.

It therefore would be useful and beneficial to have a 3DHMI system that tracks very rapid user interaction in a true volumetric space. With such a system, advertisers, product designers, physicians, gamers, military planners, etc., would be able to, or allow their customers to, view, touch, and otherwise interact with information in a true three-dimensional volumetric environment substantially in real time.

SUMMARY OF THE INVENTION

Accordingly, it is an advantage of one embodiment of the present invention that a three-dimensional virtual-touch human-machine interface system and method therefor is provided.

It is another advantage of one embodiment of the present invention that a three-dimensional virtual-touch human-machine interface system is provided that projects an image in an interactive volumetric field.

It is another advantage of one embodiment of the present invention that a three-dimensional virtual-touch human-machine interface system is provided that detects the presence of a user object within that interactive volumetric field.

It is yet another advantage of one embodiment of the present invention that a three-dimensional virtual-touch human-machine interface system is provided that provides tracking of that user object through that interactive volumetric field substantially in real time.

It is another advantage of one embodiment of the present invention that a three-dimensional virtual-touch human-machine interface system is provided that executes a programmed function when the position of a user object is substantially coincident with the position of an image within the interactive volumetric field.

The above and other advantages of the present invention are carried out in one form by a three-dimensional virtual-touch human-machine interface system incorporating a three-dimensional object sensor configured to detect a position of a user object within a first three-dimensional space, and a three-dimensional display configured to display an image within a second three-dimensional space. The image is configured to have an active region. A computer couples to the sensor and the display, is configured to map the position of the user object within a third three-dimensional space, is configured to map a position of the active region within the third three-dimensional space, and is configured to determine when the positions of the user object and the active region of the image are substantially coincident within the third three-dimensional space.

The above and other advantages of the present invention are carried out in another form by a method of determining virtual touch within a three-dimensional virtual-touch human-machine interface system. The method includes displaying an initial three-dimensional image containing an image wherein an active region of the image is in a three-dimensional space, detecting a presence of a user object within the three-dimensional space, mapping a position of the user object, and determining if the user object is substantially coincident with the active region of the image.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
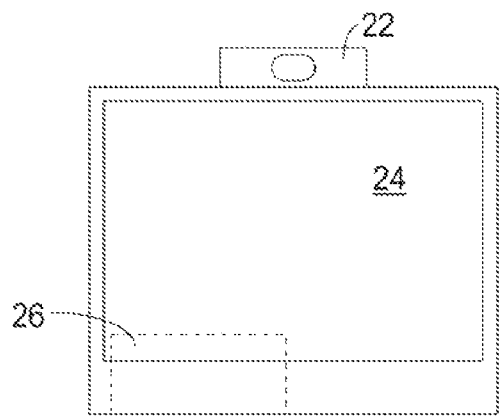
FIG. 1 depicts a front view of a three-dimensional virtual-touch human-machine interface system in accordance with a preferred embodiment of the present invention.
Figure 2:
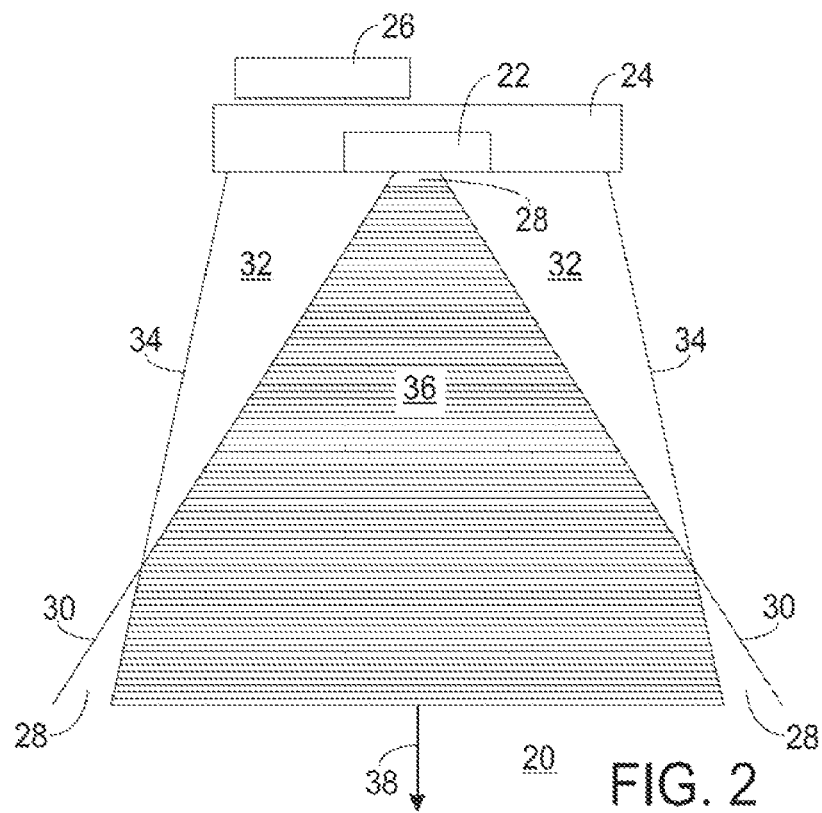
FIG. 2 depicts a top view of the system of FIG. 1 demonstrating overlapping fields for a three-dimensional object sensor and a three-dimensional display in accordance with a preferred embodiment of the present invention.
Figure 3:
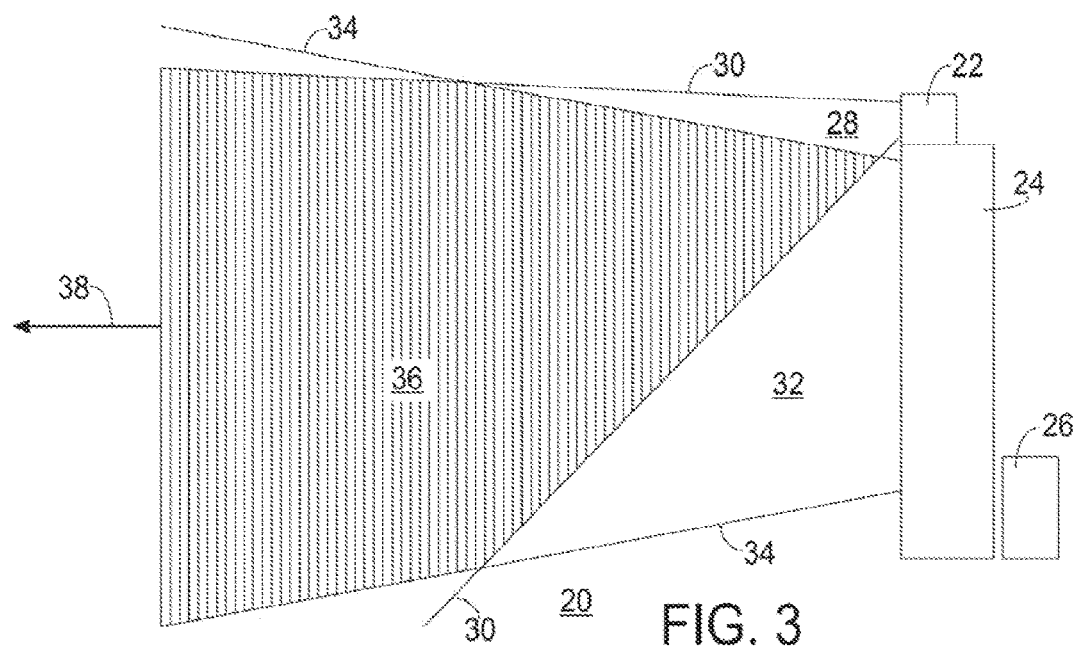
FIG. 3 depicts a side view of the system and overlapping sensor and display fields of FIG. 2 in accordance with a preferred embodiment of the present invention.

FIGS. 1, 2, and 3 depict front, top, and side views, respectively, of a three-dimensional virtual-touch human-machine interface (HMI) system 20 in accordance with a preferred embodiment of the present invention. FIGS. 2 and 3 further demonstrate overlapping fields for a three-dimensional object-position sensor 22 and a three-dimensional display 24 of system 20. The following discussion refers to FIGS. 1, 2, and 3.

System 20 includes three-dimensional object-position sensor 22, three-dimensional display 24, and a computer 26.

Sensor 22 is a three-dimensional object-position sensor. That is, sensor 22 is configured to detect the position of an object in a three-dimensional sensor space 28. Sensor 22 senses the position of objects within sensor space 28 bounded by sensor field-of-view limits 30. Assuming that sensor field-of-view limits 30 are planes (not a requirement of the present invention), then sensor space 28 is substantially a truncated pyramid having a vertical but unbounded base and whose truncated apex is substantially sensor 22.

Desirably, sensor 22 is a time-of-flight depth sensor (e.g., a DP300 SERIES 3D TOF SENSOR from Canesta, Inc., San Jose, Calif.). Such a sensor determines the position of an object in space based upon the time light takes to travel from sensor 22 to the object and back (i.e., the time of flight of light). The use of a time-of-flight sensor 22 can render very accurate and very fast position information for the object in question. The accuracy and speed of a time-of-flight sensor 22 allows system 20 to be operated substantially in real time. That is, the system lag time inherent in sensor 22 and computer 26 is substantially negligible under human-interaction conditions.

Those skilled in the art will appreciate that, while sensor 22 is desirably a time-of-flight depth sensor, this is not a requirement of the present invention. Other sensors capable of detecting the position of an object in three-dimensional space may be used without departing from the spirit of the present invention.

Display 24 is a three-dimensional display. That is, display 24 "projects" a three dimensional image that appears to float in a three-dimensional display space 32 in front of display 24. Those skilled in the art will appreciate that the three-dimensional image is not necessarily projected in the mechanical sense. Rather, the image is configured to be perceived by the user as occupying three-dimensional space. Display 24 makes available a different image for each eye. The user's mind assembles these images into a single image and interprets them as a three-dimensional image in space.

Display 24 projects three-dimensional images in display space 32 bounded by display limits 34. Assuming that display limits 34 are planes (not a requirement of the present invention), then display space 32 is substantially a truncated pyramid having a vertical but unbounded base and whose truncated apex is substantially coincident with the screen of display 24.

Desirably, display 24 is a three-dimensional autostereoscopic display. By being an autostereoscopic display, the need for polarized glasses or other viewing apparatuses is eliminated.

More desirably, display 24 is a three-dimensional autostereoscopic liquid-crystal display (e.g., 42" 42-3D6W01 WOW 3D LCD DISPLAY from Koninklijke Philips Electronics N.V., the Netherlands), or a three-dimensional autostereoscopic plasma-screen display (e.g., a 50" 3D PLASMA DISPLAY from NTT Data Sanyo System Corporation, Japan). Liquid-crystal and plasma screen displays produce three-dimensional images having superior clarity over other technologies currently available.

Those skilled in the art will appreciate that, while display 24 is desirably a three-dimensional autostereoscopic display, this is not a requirement of the present invention. Other displays capable of presenting an image in three-dimensional space may be used without departing from the spirit of the present invention.

Computer 26 is coupled to sensor 22 and display 24, desirably via a digital data link (not shown). Computer 26 integrates and processes the data to/from sensor 22 and display 24 to produce a three-dimensional interactive volumetric field 36 in front of display 24. Field 36 is that three-dimensional space mutually within sensor space 28 and display space 32. That is, field 36 is that three-dimensional space that is common to both sensor space 28 and display space 32, and excludes those portions of sensor space 28 and display space 32 that are not common.

In all embodiments of system 20, the planar, two-dimensional HMI environment of the prior art is transformed into a volumetric, three-dimensional HMI environment through the use of field 36. Field 36 requires no physical surface to facilitate the HMI interface.

Field 36 is unbounded in a direction 38 away from display 24. That is, the depth of field 36 in direction 38 is a function of the sensitivity of sensor 22 and the projection ability of display 24, and lacks a definite boundary.

Figure 4:
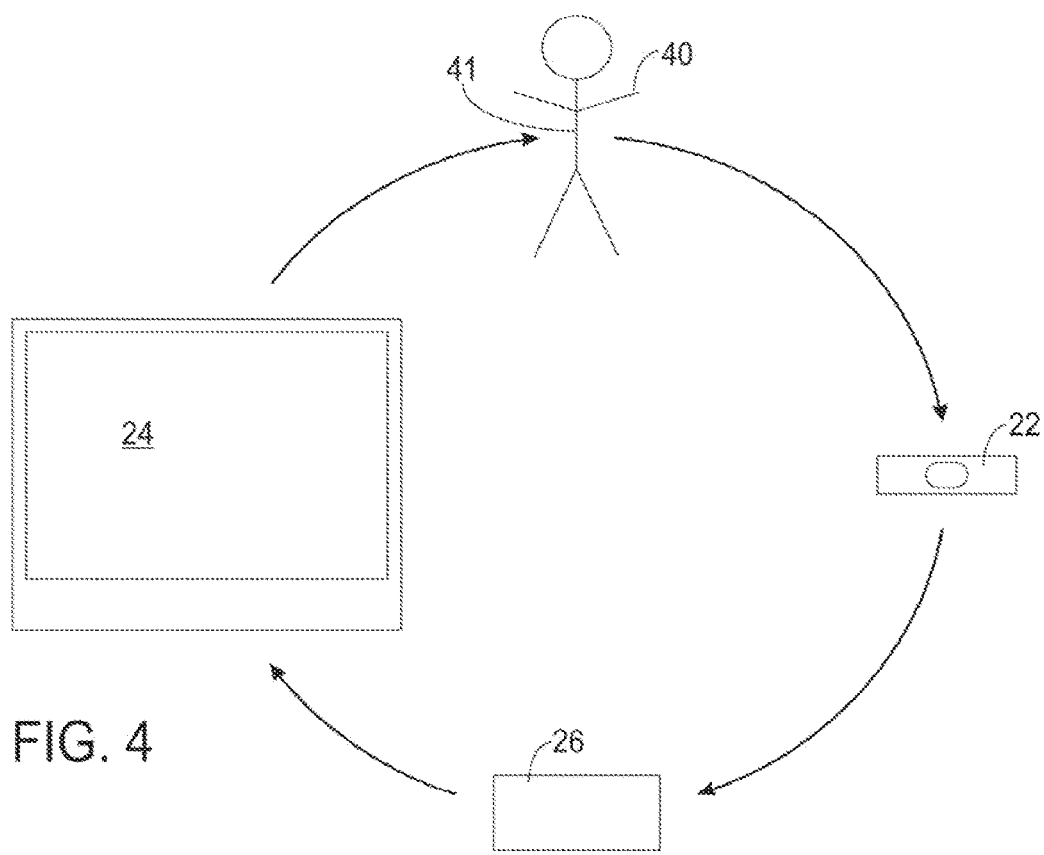
FIG. 4 depicts a diagram of the data flow through the system of FIG. 1 in accordance with a preferred embodiment of the present invention.
Figure 5:
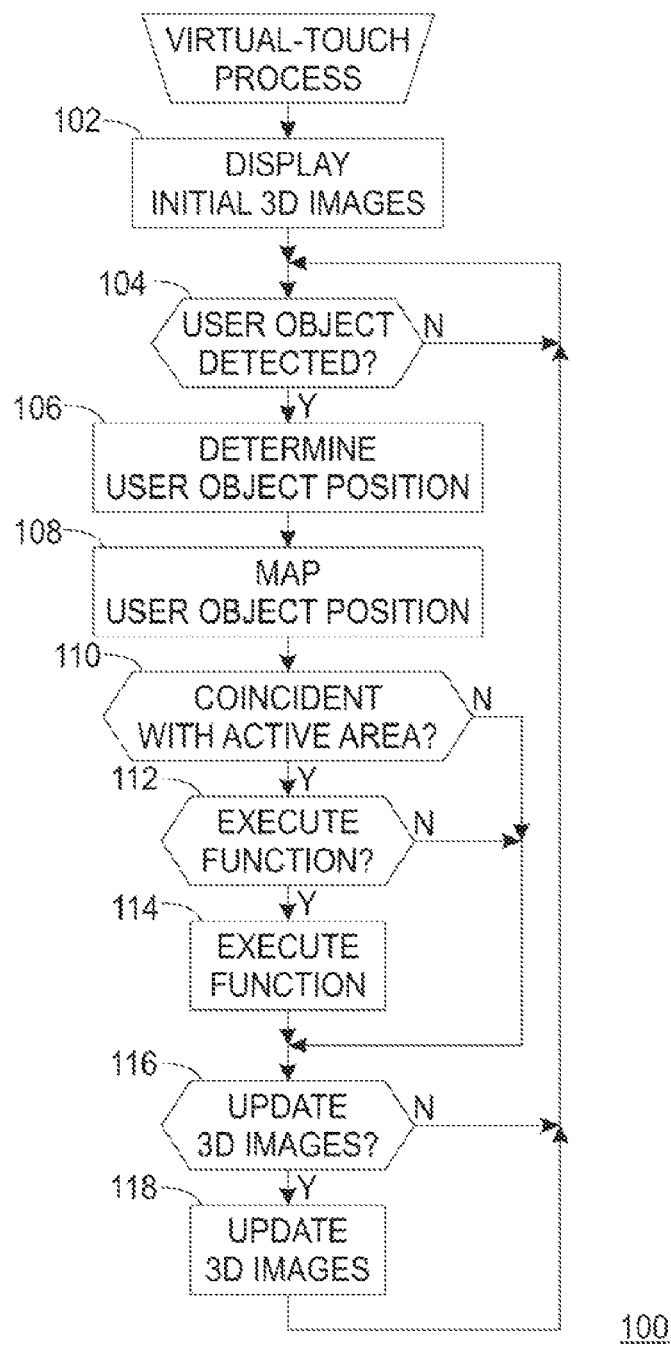
FIG. 5 depicts a flowchart of a process for the system of FIG. 1 in accordance with a preferred embodiment of the present invention.
Figure 6:
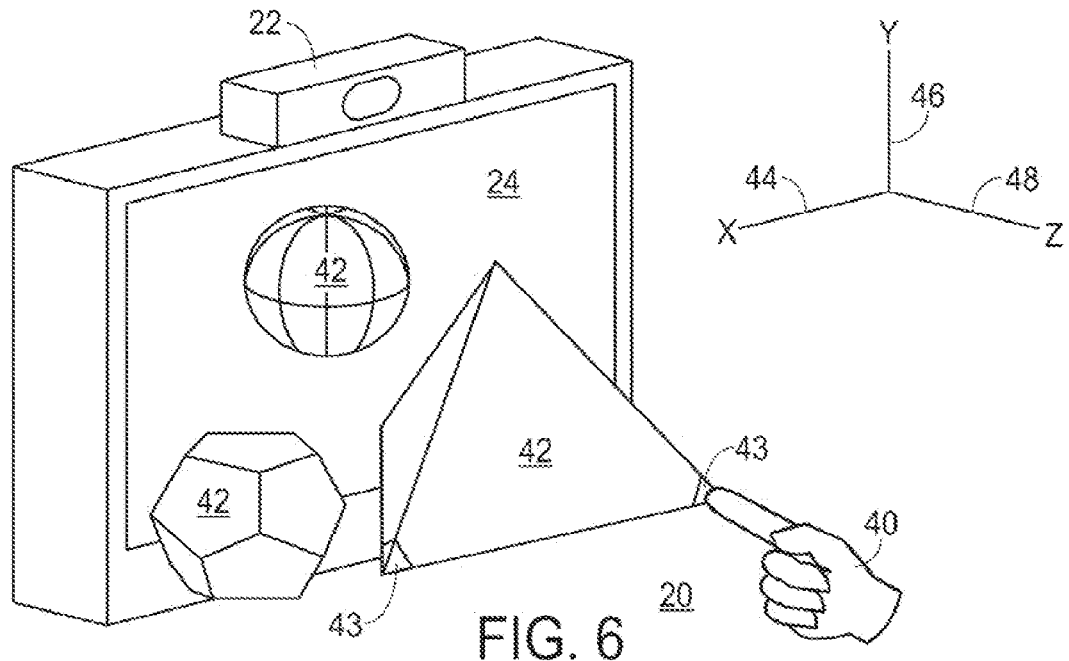
FIG. 6 depicts a dimetric view of the system of FIG. 1 demonstrating a user effecting a virtual touch on an image.
Figure 7:
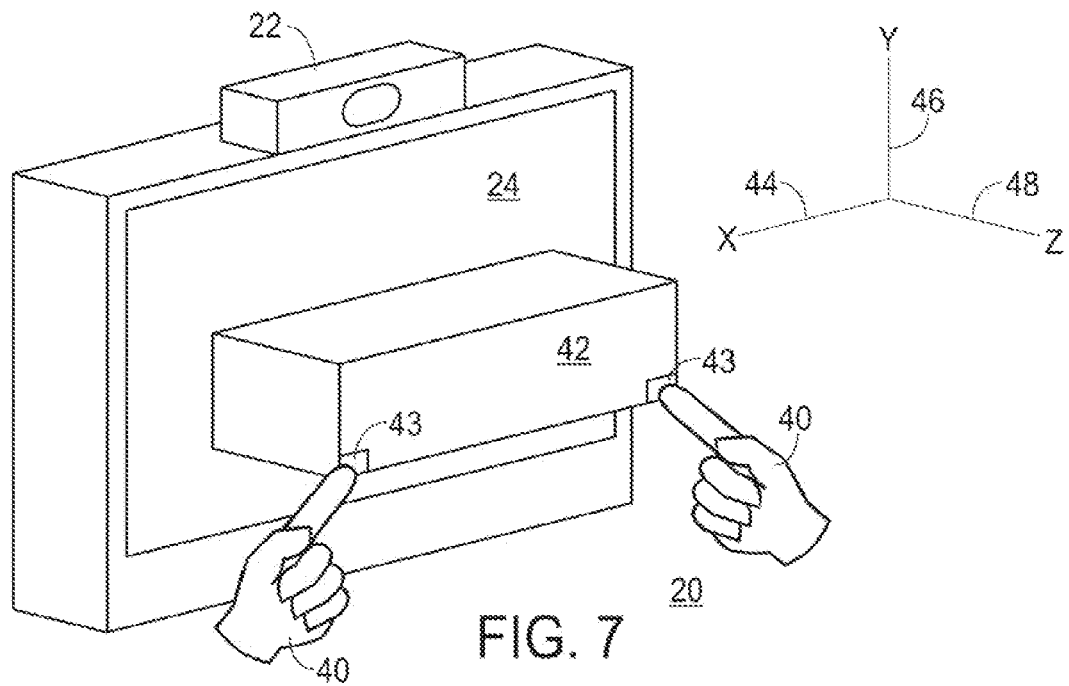
FIG. 7 depicts a dimetric view of the system of FIG. 1 demonstrating multiple virtual touches on an image.

FIG. 4 depicts a diagram of data flow through system 20, and FIG. 5 depicts a flowchart of a virtual-touch process 100 for system 20 in accordance with a preferred embodiment of the present invention. FIGS. 6 and 7 depicts dimetric views of system 20 demonstrating user objects 40 effecting a virtual touch (FIG. 6) and virtual touches (FIG. 7) on an image 42 in accordance with a preferred embodiment of the present invention. The following discussion refers to FIGS. 1, 2, 3, 4, 5, 6, and 7.

System 20 allows a user object 40 to reach out and virtually touch and control images 42 that appear to float in field 36. Computer 26 contains software (not shown) configured to effect virtual-touch process 100 for system 20.

Process 100 begins with a task 102 to display initial three-dimensional images 42 in display space 32. Display 24 projects one or more images 42 into display space 32. At least one of images 42 has an active region 43 within field 36. This initial image 42 provides a three-dimensional picture displayed by system 20 in a turn-on condition, awaiting user input. A task 118 (discussed hereinafter) iteratively updates this initial image 42 to provide subsequent images 42.

While display 24 can project images 42 into all portions of display space 32, portions of display space 32 do not share space with sensor space 28, hence are not within field 36. While images 42 may be displayed within these portions of display space 32, user objects attempting to "touch" such images 42 cannot be sensed by sensor 22. Therefore, while portions of images 42 may be outside of field 36, all active regions 43 of such images 42 should be within field 36, i.e., within sensor space 28.

Display 24, in conjunction with computer 26, displays images 42 in three-dimensional (X,Y,Z) space. That is, each image 42 has a breadth (a size in an X dimension 44), a height (a size in a Y dimension 46), and a depth (a size in a Z dimension 48). The positions of all active regions 43 of all images 42 are mapped within computer 26. By being mapped, computer 26 "knows" the coordinates of each active region 43, and will be able to recognize when user object 40 is substantially at those coordinates.

A query task 104 determines if sensor 22 detects a user object 40 within sensor space 28. Sensor 22 has the capability to detect the presence of user object 40. The term "user object" 40, as used herein, encompasses the whole of a physical user 41 (human or otherwise), any portion of user 41 (e.g., hand, head, torso, etc.), or a secondary object (e.g., pencil, probe, glove, etc.) user 41 may use to penetrate sensor space 28.

Sensor 22 detects user object 40 anywhere in sensor space 28. However, only that portion of sensor space 28 that is shared by display space 32, i.e., within field 36, is germane to operation. Computer 26 "knows" when sensor 22 detects user object 42 within that portion of sensor space 28 within field 36.

If query task 104 determines that sensor 22 does not detect the presence of user object 40 within field 36, then process 100 loops back and query task 104 iterates until such a presence is detected.

When query task 104 determines that sensor 22 detects the presence of user object 40, then a task 106 determines the position of user object 40 within field 36, and a task 108 maps that position within field 36. By mapping the position of user object within field 36, computer 26 "knows" the coordinates of that user object 40, and can plot movement of that user object 40 through field 36.

When sensor 22 has been realized as a time-of-flight sensor, the speed and accuracy of sensor 22 allow computer to track a moving user object 40 in substantially real time, i.e., a position is mapped scant milliseconds after it is reached. This allows system 20 to be very fast and accurate.

A query task 110 then determines if the position of user object 40 is substantially coincident with an active region 43 of image 42 within field 36. Active region 43 of image 42 is that portion of image 42 programmed to be interactive, e.g., a "button." Of course, nothing prevents the entirety of an image 42 from being programmed to serve as an active region 43. It will be appreciated that active region 43 may be programmed as a one-dimensional point, a two-dimensional area, or a three-dimensional volume.

The term "substantially coincident" indicates that the coordinates mapped by computer 26 for user object 40 are coincident with or encompass at least a portion of the coordinates mapped for that active region 43. This represents a virtual touch condition, e.g., a virtual button push, and is equivalent to a physical touch of a physical touchpad or a physical push of a physical button or key.

If query task 110 determines that the position of user object 40 is not substantially coincident with active region 43 of image 42, then process 100 jumps ahead to a query task 116 (discussed hereinafter). This allows the position of user object 40 to be tracked it moves through field 36.

If query task 110 determines that the position of user object 40 is substantially coincident with active region 43 of image 42, then a query task 112 ascertains if the function programmed for active region 43 of image 42 is to be executed.

Computer 26 evaluates the action of user object 40 versus the programmed function. For example, if user object 40 is moving, i.e., if every detection of user object 40 is at a different position within field 36, then computer 26 may most likely determine that user 41 does not wish to execute the programmed function.

Conversely, if user object 40 has stopped, i.e., two or more consecutive detections of user object 40 occur at substantially the same position within field 36, then computer 26 may most likely determine that user 41 wishes to execute the programmed function. This would constitute a "click" or selection on active region 43 of image 42. User 41 has executed a virtual touch of image 42.

If query task 112 determines that the function programmed for active region 43 of image 42 is not to be executed, then process 100 jumps ahead to query task 116 (discussed hereinafter).

If query task 112 determines that the function pre-programmed for active region 43 of image 42 is to be executed, then a task 114 executes that function. This is analogous to clicking a mouse when a cursor is over a screen "button," and having a computer perform the function pre-programmed for that button.

If task 114 executes the desired function, if query task 110 determines that the position of user object 40 is not substantially coincident with active region 43 of image 42, or if query task 112 determines that the function programmed for active region 43 of image 42 is not to be executed, then query task 116 determines if a three-dimensional image 42 produced by display 24 is to be updated, i.e., changed in any manner. It will be appreciated that any image 42 may change at any time, independent of user interaction. For example, an image 42 may appear to float freely in space until "touched," at which time that image 42 and any other desired images 42 may "pop" or otherwise disappear or change.

If query task 116 determines that any image 42 is to be updated, then in a task 118, image 42 is updated and display 24 projects one or more images 42 into field 36. This updating process is iterated for every change of image 42 in system 20, and allows system 20 to proceed through all images 42 in use.

After task 118, or if query task 116 determines that no images 42 are to be updated, process 100 loops back to query task 104.

Those skilled in the art will appreciate that process 100 as described herein is exemplary only. Variants on process 100 may be incorporated without departing from the spirit of the present invention.

FIG. 6 depicts user object 40 selecting or "clicking" active region 43 of image 42, i.e., the rightmost front apex of the tetrahedron. By moving user object 40 to the same spatial coordinates as the rightmost apex, user 41 makes contact with or virtually touches active region 43 of image 42. When the virtual touch is made, whatever function is programmed for active region 43 of image 42 is executed.

In a more interactive example (not shown), user 41 may play a dynamic, action-based game with system 20. A three-dimensional ball may be displayed, and appear to float in front of display 24. User 41 may "hit" the ball with his hand, and the ball would appears to move into display 24, facilitating a dynamic, interactive three-dimensional gaming environment.

It will be readily appreciated that the function programmed for active region 43 of image 42 may involve modification of the appearance of image 42, e.g., resizing, rotating or repositioning.

FIG. 7 shows multiple user objects 40 establishing virtual contact with image 42. This enables a multi-user, collaborative interface.

Those skilled in the art will appreciate that there are no known limitations to the physical size of an embodiment of system 20. System 20 has the capability to operate in embodiments of variable physical size, e.g., portable systems (cellular telephones, personal digital assistants, etc.), desktop systems, big-screen television systems, and/or systems with wall-sized displays. In physically larger applications, such as wall-size display systems 20, multiple sensors 22 may be used to provide full coverage of field 36.

Those skilled in the art will appreciate that the preferred embodiment of system 20 discussed hereinbefore and shown in the Figures is exemplary only. System 20 may be realized as any of a plurality of embodiments, each serving a specific need.

Realizations of system 20 may include, but are not limited to, the following embodiments.

System 20 may be realized as an advertising system. In this embodiment, the three-dimensional display aspects of system 20 may be used to attract the attention of potential customers. These potential customers may then view items of interest in three dimensions, and may make selections through virtual touch.

System 20 may be realized as a public peripheral-free system. In this embodiment, system 20 requires no special peripheral devices besides the basic human form. This enables an immediate and intuitive ability to use system 20 by the mass public.

System 20 may be realized as a virtual gaming system. In this embodiment, a gamer may simulate physical contact and interaction with gaming elements and other players in three dimensions. This also creates an aerobic environment involving physical movement on the part of the gamers. This concept may be extended to whole-body interaction.

System 20 may be realized as a public contamination-free system. In this embodiment, system 20 serves as a sterile, contact-free system for public use (e.g., at a Kiosk, ATM, airport check-in, etc.). This embodiment is especially desirable to aid in curtailing the spread of disease. This embodiment of system 20 is therefore useful where potential contamination may be a problem, such as at airports, or during virulent outbreaks, as with various forms of influenza.

System 20 may be realized as a sterile medical system. In this embodiment, system 20 provides a sterile, contact-free system in which all interaction with the system may be accomplished with hand or body gestures in space, without physical system contact.

System 20 may be realized as an interactive viewing system. Complex three-dimensional data, such as molecular structures, magnetic resonance images, and ultrasound images, are typically viewed in two-dimensions, i.e., on a flat, two-dimensional monitor. In this embodiment, system 20 would allow the operator to view and interact with complex three-dimensional data in three dimensions.

System 20 may be realized as a secure data entry system. System 20 may be realized with a narrow and limited field of view. This would allow user 41 to access confidential data while minimizing the possibility of that data being visible to others proximate user 41. This embodiment is ideal for automatic teller machines, voting machines, and other publicly placed systems that deal with confidential and/or personal data.

System 20 may be realized as an interactive prototyping system. In this embodiment, designers may visualize, evaluate and modify objects in three dimensions. This may result in an increase in design capabilities and a reduction in design time.

System 20 may be realized as a training system. In this embodiment, users 41 may train on new equipment virtually in a three-dimensional environment. This may provide a more effective, more realistic, and more cost-effective training methodology.

System 20 may be realized as a total immersion system. In this embodiment, system 20 may provide the capability for total immersion of user 41 by using three-dimensional autostereoscopic displays that envelope user 41. This may include wall-sized displays, or may include flex-screen displays that curve to accommodate peripheral vision.

Those skilled in the art will appreciate that the exemplary embodiments of system 20 discussed herein are not limiting. Many other embodiments of system 20 not discussed herein may be realized without departing from the spirit of the present invention.

In summary, the present invention teaches a three-dimensional virtual-touch human-machine interface system 20 and a method therefor using virtual-touch process 100. System 20 incorporates a three-dimensional display 24 that produces an image 42 in an interactive volumetric field 36. System 20 incorporates a three-dimensional object sensor 22 that detects the presence of a user object 40 within field 36, and tracks user object 40 through field 36 substantially in real time. System 20 incorporates a computer 26 that maps the positions of image 42 and user object 40 within field 36 and executes a programmed function when those positions are substantially coincident.

Although the preferred embodiments of the invention have been illustrated and described in detail, it will be readily apparent to those skilled in the art that various modifications may be made therein without departing from the spirit of the invention or from the scope of the appended claims.

The invention claimed is:
1. A three-dimensional interface system, comprising:
one or more three-dimensional time-of-flight object sensors configured to detect a position of a user object within a first three-dimensional space;
a three-dimensional display configured to display one or more images within a second three-dimensional space bounded by display limits, individual images of the one or more images being displayed as if in three-dimensional space, an individual images of the one or more images having a breadth corresponding to a size in an x-dimension, a height corresponding to a size in a y-dimension, and a depth corresponding to a size in a z-dimension, and the individual images of the one or more images having at least one corresponding active region being defined by x, y and z coordinates programmed to be interactive with a user object; and a computer coupled to said sensor and said display, configured to map said position of said user object within a third three-dimensional space including x, y and z axis coordinates wherein the third three-dimensional space is common to both the first three-dimensional space and the second three-dimensional space, configured to map a position of said one or more active regions of said corresponding one or more images within said third three-dimensional space, and configured to determine whether said positions of said user object and one or more of said active regions of said corresponding one or more images are substantially coincident within said third three-dimensional space, so that the computer can differentiate between two or more of said active regions differing only in z axis coordinates in said third three-dimensional space.

2. The system as claimed in claim 1 wherein said three-dimensional display is a three-dimensional autostereoscopic display.

3. The system as claimed in claim 1 wherein said three-dimensional display is a three-dimensional autostereoscopic liquid crystal display.

4. The system as claimed in claim 1 wherein said three-dimensional display is a three-dimensional autostereoscopic plasma-screen display.

5. The system of claim 1 wherein the three-dimensional display provides a different image for each eye of a viewer.

6. The system as claimed in claim 1 wherein said three-dimensional display is configured to display said one or more active regions of said one or more images in said first three-dimensional space.

7. The system as claimed in claim 1 wherein said third three-dimensional space is mutually within said first and second three-dimensional spaces.

8. The system as claimed in claim 1 wherein said first three-dimensional space is bound by first limits; said second three-dimensional space is bound by second limits; said third three-dimensional space is bound by said first and second limits.

9. The system as claimed in claim 8 wherein said third three-dimensional space is unbounded in a direction away from said display.

10. The system as claimed in claim 1 wherein said one or more images is one of a plurality of images; and said display is configured to display said plurality of images within said second three-dimensional space so that a user interacting with the three-dimensional display is able to view the plurality of images as if they were in three-dimensional space.

11. The system as claimed in claim 1 wherein said user object is one of a plurality of user objects; and said sensor is configured to detect said one user object within said first three-dimensional space.

12. The system as claimed in claim 1 wherein said user object is a secondary object.

13. The system as claimed in claim 12, wherein said secondary object is separate from a portion of a user.

14. A method of determining virtual touch within a three-dimensional interface system, comprising the operation of:
displaying, through the use of a three-dimensional display, one or more images within a first three-dimensional space so that the one or more images are displayed as if positioned in the first three-dimensional space, wherein individual images of the one or more images have a breadth corresponding to a size in an x-dimension, a height corresponding to a size in a y-dimension, and a depth corresponding to a size in a z-dimension, and the individual images of the one or more images having at least one corresponding active region defined by x, y and z coordinates programmed to be interactive with a user object;
detecting a presence of a user object including x, y and z axis coordinates, within a second three-dimensional space through the use of one or more three-dimensional time-of-flight sensors;
mapping, through a computer, within a third three-dimensional space common to both the first three-dimensional space and the second three-dimensional space, a position of the user object in the second three-dimensional space and a position of the at least one corresponding active region of the one or more images within the first three-dimensional space; and
determining, by the computer, whether the position of the user object is substantially coincident with the position of the at least one corresponding active region of the one or more images along each of the x, y and z axis coordinates within the third three-dimensional space so that the computer can differentiate between two or more of said active regions differing only in z axis coordinates in said third three-dimensional space.

15. The method as claimed in claim 14, further comprising:
returning to said detecting activity following said determining activity.

16. The method as claimed in claim 14 wherein said mapping and determining activities are executed responsive to detecting said presence of said user object; and said detecting activity is iterated responsive to detecting no presence of said user object.

17. The method as claimed in claim 14, further comprising returning to said detecting activity responsive to determining said user object is not substantially coincident with said active region.

18. The method as claimed in claim 14, further comprising:
responsive to determining that the user object is substantially coincident with the position of the at least one corresponding active region of the one or more images, determining whether a function programmed for the at least one corresponding active region of an individual image of the one or more images is to be executed;
responsive to determining that the function programmed for the at least one corresponding active region of the one or more images is to be executed, executing the function; and
responsive to executing the function, updating the individual image to display an updated image in the first three-dimensional space.

19. The method as claimed in claim 18, further comprising: returning to said detecting activity responsive to ascertaining said function is not to be executed.

20. The method as claimed in claim 14, further comprising establishing said position of said user object prior to said mapping activity.

21. The method as claimed in claim 14, further comprising:
displaying the one or more images containing at least one image, wherein a plurality of active regions of said at least one image is in said first three-dimensional space;
detecting a presence of one or more user objects within said second three-dimensional space;
mapping said position of each of said one or more user objects within said third three-dimensional space; and determining whether one or more of said one or more user objects is substantially coincident with one of said plurality of active regions.

22. A three-dimensional interface system comprising:

one or more three-dimensional time-of-flight sensors configured to detect a position of a user object having x, y and z axis coordinates within a first three-dimensional space;

a three-dimensional display configured to display one or more images within a second three-dimensional space, individual images of said one or more images having at least one individual corresponding active region having x, y and z axis coordinates within a third three-dimensional space mutually within said first and second three-dimensional spaces, and unbounded in a direction away from said display so that a user interacting with the three-dimensional display is able to view the one or more images as if they were in three-dimensional space, and with individual active regions of a corresponding image being a portion of the corresponding image that is programmed to be interactive with one or more user objects; and a computer coupled to said sensor and said display, configured to map a position of said one or more user objects within said third three-dimensional space, configured to map a position of said one or more images within said third three-dimensional space along with said at least one corresponding active regions, and configured to determine when said positions of one or more of said one or more user objects and said at least one corresponding active regions of said one or more images are substantially coincident within said third three-dimensional space so that the computer can differentiate between two or more active regions differing only in z axis coordinates in said third three-dimensional space.

* * * * *